(12) United States Patent
Sickels et al.

(10) Patent No.: US 7,895,020 B2
(45) Date of Patent: Feb. 22, 2011

(54) SYSTEM AND METHOD FOR MULTI-PERSPECTIVE COLLABORATIVE MODELING

(75) Inventors: Stephen Sickels, Vienna, VA (US); Matthew Humprhey, Stafford, VA (US); Bradley Moskowitz, Vienna, VA (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 532 days.

(21) Appl. No.: 10/845,528

(22) Filed: May 14, 2004

(65) Prior Publication Data

US 2005/0222836 A1 Oct. 6, 2005

Related U.S. Application Data

(60) Provisional application No. 60/559,144, filed on Apr. 1, 2004.

(51) Int. Cl.
*G06F 17/10* (2006.01)
*G06K 9/32* (2006.01)
*G06K 9/36* (2006.01)

(52) U.S. Cl. .............................. 703/2; 382/285; 382/294

(58) Field of Classification Search .................... 703/2, 703/6–7; 719/316; 707/8; 717/120, 121; 382/284–285, 293–294
See application file for complete search history.

(56) References Cited

U.S. PATENT DOCUMENTS 4,970,666 A * 11/1990 Welsh et al. ................ 345/423
5,327,558 A 7/1994 Burke et al.

(Continued)

FOREIGN PATENT DOCUMENTS

JP 2001-319030 11/2001

(Continued)

OTHER PUBLICATIONS

Date, C.J. An Introduction to Database Systems, 3$^{rd}$ Ed. © 1981. pp. xxi-xxvii, 1-28, 33-53, and 63-79.*

(Continued)

*Primary Examiner*—Paul L Rodriguez
*Assistant Examiner*—Andre Pierre Louis
(74) *Attorney, Agent, or Firm*—Steptoe & Johnson LLP

(57) ABSTRACT

One method according to the present invention may include defining a first object. The first object may have a unique object identifier. The method may also include defining a second object. The second object may also have a unique object identifier. After the objects have been identified, the method may include receiving a first value and a second value associated with the first object. The method may also include representing either an agreement and a lack of agreement associated with the first object based on a relationship between the first value and the second value. In an alternative embodiment, both an agreement and a disagreement may be represented based on the first value and the second value. In one embodiment of the invention, the representation of an agreement and/or a disagreement may be performed internally, using, for example, hexadecimal or binary representations of agreement or a lack of agreement. In yet another embodiment of the invention, a first single-perspective model and a second single-perspective model may be compared to form a multi-perspective model. Intentions of the parties within the collaborative community may be maintained throughout the modeling process.

13 Claims, 12 Drawing Sheets

U.S. PATENT DOCUMENTS

| | | | |
|---|---|---|---|
| 5,379,374 | A | 1/1995 | Ishizaki et al. |
| 5,446,842 | A | 8/1995 | Schaeffer et al. |
| 5,649,105 | A * | 7/1997 | Aldred et al. ............... 709/220 |
| 5,781,732 | A | 7/1998 | Adams |
| 6,047,314 | A | 4/2000 | Pommier et al. |
| 6,175,652 | B1 * | 1/2001 | Jacobson et al. ............ 382/216 |
| 6,182,115 | B1 | 1/2001 | Cuomo et al. |
| 6,233,600 | B1 | 5/2001 | Salas et al. .................. 709/201 |
| 6,363,352 | B1 | 3/2002 | Dailey et al. |
| 6,401,038 | B2 * | 6/2002 | Gia ............................. 701/301 |
| 6,557,027 | B1 | 4/2003 | Cragun |
| 6,640,241 | B1 | 10/2003 | Ozzie et al. |
| 6,678,882 | B1 | 1/2004 | Hurley et al. |
| 2001/0013055 | A1 | 8/2001 | Kojima et al. |
| 2001/0044827 | A1 | 11/2001 | Zhuk |
| 2002/0010744 | A1 | 1/2002 | Prell et al. |
| 2002/0073151 | A1 | 6/2002 | Rogers et al. |
| 2003/0018701 | A1 | 1/2003 | Kaestle et al. |
| 2003/0061330 | A1 | 3/2003 | Frisco et al. |
| 2003/0097410 | A1 | 5/2003 | Atkins et al. |
| 2003/0137449 | A1 * | 7/2003 | Vashisth et al. ........ 342/357.08 |
| 2003/0177205 | A1 | 9/2003 | Liang et al. |
| 2003/0179230 | A1 | 9/2003 | Seidman |
| 2003/0195932 | A1 | 10/2003 | Tanabe et al. |
| 2003/0225926 | A1 | 12/2003 | Nosek |
| 2003/0236693 | A1 | 12/2003 | Chen et al. |
| 2003/0236820 | A1 | 12/2003 | Tierney et al. |
| 2004/0060037 | A1 * | 3/2004 | Damm et al. ............... 717/104 |
| 2004/0071366 | A1 * | 4/2004 | Zhang et al. ................ 382/284 |

FOREIGN PATENT DOCUMENTS

| | | |
|---|---|---|
| JP | 2001319030 | 11/2001 |

OTHER PUBLICATIONS

Bernstein et al. "Concurrency Control in Distributed Database Systems", Computing Surveys, vol. 13, No. 2 (Jun. 1981).

Chen et al., A Distributed Algorithm for Graphic Objects Replication in Real-Time Group Editors, Proc. of ACM Conference on Supporting Group Work, Phoenix, AZ (Nov. 1999).

Reid, Donald A., "An Algorithm for Tracking Multiple Targets," IEEE Transactions on Automatic Control, vol. AC-24. No. 6, pp. 843-854, (Dec. 1979).

Sung, et al., "Concurrency Control in CIAO", IEEE Virtual Reality (Abstract) Mar. 13-17, 1999 available at http://csdl.computer.org/comp/proceedings.

Microsoft Office Online, "Team up on PowerPoint Presentations" 2 pages (available prior to Apr. 1, 2004) available at www. microsoft.com/assistance/2002/articles/ppWhichWayToCollaborate.aspx.

CVW, "Collaborative Virtual Workspace Overview", 5 pages (available prior to Apr. 1, 2004) available at http://cvw.sourceforge.net/cvw/info/CVWOverview.php3.

Mishra et al., "CollabCAD: A Toolkit for Integrated Synchronous and Asynchronous Sharing of CAD Applications," 2 pages, available at http://citeseer.nj.nec.com/282772.html (Available prior to Apr. 1, 2004).

CollabCAD, "CollabCAD Software", 3 pages, available at http://www.collabcad.com (Available prior to Apr. 1, 2004).

CVW, "CVW 4.0", 2 pages (available prior to Apr. 1, 2004) available at http://cvw.sourceforge.net/.

Microsoft, "Windows NetMeeting", 1 page available at http://www.microsoft.com/windows/netmeeting/ (available prior to Apr. 1, 2004).

CoCreate OneSpace.net Collaboration Software, 1 page, available at http://www.onespace.net/ (available prior to Apr. 1, 2004).

Groov Networks, "Groove Networks", 1 page, available at http://www.groove.net (available prior to Apr. 1, 2004).

Document eRoom, 2 pages, available at http://www.documentum.com/products/dctm_eroom.htm (available prior to Apr. 1, 2004).

Cederqvist, et al. "Version Management with CVS, for CVS 1.11.6" available at www.cvshome.org/docs/manual/ (available prior to Apr. 1, 2004).

Peterson et al., Error-Correcting Codes (2d Ed.), pp. 412-425 (1961).

Advanced Reality, "Presence-AR", 1 page, available at http://www.advancedreality.com (available prior to Apr. 1, 2004).

Interwoven, Inc.—Enterprise Content Management, 1 page, available at http://imanage.com (available prior to Apr. 1, 2004).

Error-Correcting Codes by W. Wesley Peterson and E. J. Weldon, Jr., 1990.

CVS—Concurrent Versions—Overview, May 26, 2003.

CoCreate OneSpace.net—Welcome to OneSpace (webpage), 2003.

NetMeeting (webpage), Jan. 28, 2002.

CVW:CVW—Collaborative Virtual Workspace, Sep. 28, 2001.

CollabCAD: Home—CollabCAD Software article, 2003.

CVW:Overview—Collaborative Virtual Workspace, Oct. 13, 2000.

Concurrency Control in CIAO—IEEE Virtual Reality, Mar. 13-17, 1999, Houston, Texas.

An Algorithm for Tracking Multiple Targets, Donald B. Reid, Dec. 6, 1979.

A distributed Algorithm for Graphic Objects Replication in Real-time Group Editors, David Chen and Chengzheng Sun, School of Computing and Information Technology, Griffith University, Brisbane, QLD 4111, Australia.

Concurrency Control in Distributed Database Systems, Philip A. Bernstein and Nathan Goodman, Computer Corporation of America, Cambridge, Massachusetts 02139, Jun. 1981.

* cited by examiner

SYSTEM AND METHOD FOR MULTI-PERSPECTIVE COLLABORATIVE MODELING

CROSS-REFERENCE TO RELATED APPLICATIONS

This application is a non-provisional application of U.S. Provisional Application Ser. No. 60/559,144, entitled "SYSTEM AND METHOD FOR MULTI-PERSPECTIVE COLLABORATIVE MODELING," filed Apr. 1, 2004, which is hereby incorporated by reference in its entirety.

STATEMENT OF FEDERALLY-SPONSORED RESEARCH

Portions of this invention were made using funding from the United States government under contract number F30602-03-C-0001.

FIELD OF THE INVENTION

This invention relates to a system and method for multi-perspective collaborative modeling. More particularly, the invention pertains to a system and method for multi-perspective collaborative modeling that is capable of performing one or both functions of preserving collaborators' (potentially conflicting) intentions throughout the model development process and indeterminacy involved with embodiments including asynchronous collaborative systems.

BACKGROUND OF THE INVENTION

In business, engineering, government, and many other fields, the need to obtain input from a number of different people is important to ensure that the optimal solution is possible. Thus, to facilitate this interaction between a number of different parties, collaborative modeling software is available. Collaborative modeling software may be configured to permit members of a collaborative community to create and edit various models. These models may include, for example, a set of properties, either concrete or abstract which may describe various objects or additional properties. Models may also describe relationships between objects within the models.

Collaborative modeling software permits a number of individuals to have input on how a model is developed. Many things may constitute a model. By way of example, physical systems may be modeled, machinery may be modeled, atomic or sub-atomic physics may be modeled, business plans may be modeled, societal dynamics may be modeled, and consumer groups may be modeled. The possibilities are endless for the number of model variations and systems that may be modeled. Modeling may include any form of association of data or values with objects that are to be modeled. Models may also include the relationship(s) of one object within a model to another object within the model.

Many people in business need input from their colleagues when undertaking a project. And in many cases projects require or benefit from the collective creation of a "model" of some system of interest. Thus, a more robust and potentially better work product may be produced, and people of various areas of expertise may be permitted to collaborate and combine their talents to produce a final work product. Models may be particularly valuable when the workgroup or community is engaged in a distributed collaborative process. Models may permit these members of the workgroup community to form an explicit basis for collective understanding, progress, and project success. Collaborative systems may be generically grouped into two basic forms: standard collaborative systems and multi-alternative collaborative systems. We also discuss a third type of system, multi-hypothesis management systems, which are not collaborative, but which bear some superficial resemblances to the invention described herein.

Standard collaborative systems permit a community of participants to interact via the collaborative software. These standard systems are generally not configured to be model-based. Examples of these sorts of systems may include, for example, various collaborative environments that handle the underlying communication and often file management infrastructure, often allowing functions such as chat, file sharing and organization, and sometimes shared creation and annotation of documents, electronic sketches, and the like. These systems, however, assume—implicitly, if not explicitly—that differences of opinion must be worked out outside of the collaborative framework. Thus, these standard collaborative systems do not include features supporting the management and resolution of a number of differing perspectives. This may be particularly problematic for collaborative modeling systems, in which "statements" tend to be made with precision, which creates a particularly fertile ground for explicit disagreement and conflict. While some of these systems may alert other users to the lack of agreement about a particular aspect of the model, the collaborative systems do not support maintenance of these differing perspectives. Rather one perspective will be adopted over other perspectives, thereby limiting the opportunity for effective collaboration over aspects of the model.

These issues are tied with two of the primary reasons current collaborative systems are problematic. The first reason is that there is no support for the maintenance of perspectives. This issue is referred to as "intention violation" and may be illustrated by a simple example. A first party is modifying values associated with one object within the model. A second party has determined that—from his perspective—the particular object should no longer exist. In this situation, the collaborative software will violate the intentions of one of the parties. If the first party is permitted to maintain the revised values associated with the object, then the second party's intention regarding the deletion of that object will be violated. Likewise, if the second party is permitted to delete the object, then the intentions of the first party will be violated. Current collaborative systems do not provide adequate protocols for maintaining multiple perspectives and permitting the lack of agreement to be worked out collaboratively.

The second reason that these systems are problematic pertains primarily to peer-to-peer (P2P) asynchronous systems. This is the problem referred to as "indeterminacy." Like intention violation, the indeterminacy problem may best be described by way of example. Assume that a first party ("Ann") and a second party ("Bill") are collaborating—not on a model, but on developing and editing some text. (We use text in this example for simplicity. The problem of indeterminacy will be present, however, any time people are collaborating with separate individual copies of anything where all copies are updated by any mechanism that involves passing around and applying all the transactions representing the changes and updates everyone is making to "their" local copy of the thing, as is described below. This will be the case for text or a model or a diagram or for any other thing on which people are collaborating.) Ann and Bill are able to work on their own copies of the text, and may share (sending and receiving) updates and edits (more formally, transactions applied to the text) to keep their individual copies up-to-date with each other. Let's say, though, that Ann goes offline and is therefore neither sending updates to nor receiving updates from Bill. When Ann comes back online, she and Bill both receive each other's updates, which must be processed in the same order on both copies of the model. To see why this is a requirement, say that while offline Ann performs a search and replace to change all instances of "ACME" to "ACME, Inc." And while Ann is offline Bill adds a sentence containing the text "ACME." When Ann comes back online the respective updates will be shared, but if Bill's updates are processed against Ann's copy of the text as and when received, Ann's and Bill's copies of the text will not be consistent (identical): Ann has already done the search and replace, so Bill's update will appear in her copy of the text as "ACME." In Bill's copy, however, he has already added "ACME," So when he receives Ann's search and replace transaction for processing against his copy of the text, the instance of "ACME" that he added will be changed to "ACME, Inc." Therefore some mechanism must be in place to ensure that both updates are processed in the same order for both copies of the text. Now say that a third party ("Cathy") is collaborating as well. Now updates must be passed around amongst the three collaborators. The same issue as above still applies, but it is now, potentially, even more complex, particularly if the collaborators are going online and offline in various overlapping and non-overlapping patterns. Put another way, all collaborators should be able to process all transactions in the same order as all other collaborators, when they are received, regardless of who was offline (and potentially making changes) and when they were offline. This may be an extremely demanding requirement, but with out some such mechanism for deterministically resolving and processing received updates, each copy of the model could be said to be "indeterminate" as long as someone is offline and potentially queuing up changes that will later be sent out to the others.

Collaborative systems that utilize the multi-alternative approach suffer from a number of deficiencies as well. A collaborative system using the multi-alternative approach permits others to work on a model, but assumes that there is one central model. One individual will have control over the model and thus alternative views may be compared to the central model and may be adjusted by the controller of the central model. This may prohibit others within the collaborating community from developing the model simultaneously. Furthermore, while intentions may be preserved for a short while, they are not preserved indefinitely, and the controller may determine to remove or violate the intentions of one or more of the collaborators. Examples of this type of system include, for example, software, such as, software version control systems that allow "branching and merging" of the versions of a product (typically a text-based document such as software source code or general documents), albeit under the central control of a facilitator or controller.

The final type of contemporary system we describe are a multiple hypothetical management systems. This type of a system may allow the input and storage of multiple values associated with a particular object. These values are hypothetical, and they are then input into an algorithm, which will test the particular hypothesis. This approach allows the expression of alternative values for various aspects of a model. It is certainly possible to apply this approach in a collaborative setting, with the collaborating individuals supplying the alternative values. However, models will ideally contain values and relationships, and this approach allows only the expression of multiple values for a given object in a model. Furthermore, these hypothetical management systems are many times not even used in collaborative environments because the work utilized is typically from one source and an algorithm will test the alternatives provided by a some other component of the system. Examples of these types of systems may come in the form of engineering-related software. Examples of such software may include, for example, multi-hypothesis tracking systems and the Viterbi decoding algorithm used in various signal processing and estimation applications.

As can be seen from the foregoing, contemporary systems do not provide adequate features to enable effective collaboration within a collaboration system. Particularly, many systems fail to preserve the intentions of the collaborators within the collaborating community. Furthermore, some of the systems are controlled by a central controller and will allow only that person to determine which perspectives to adopt. Therefore, what is needed is a system and method for enabling multi-perspective collaborative modeling in which intentions are preserved indefinitely. Furthermore, what is needed is a system and method for multi-perspective collaborative modeling that will establish ownership over a particular perspective within the model, and will facilitate social interaction among collaborators to reach agreement—or, potentially, to preserve meaningful disagreement—over particular aspects of the model.

SUMMARY OF THE INVENTION

In light of the above-identified deficiencies of contemporary methods and systems, it is thus an object of the present invention to provide a system and method for permitting multi-perspective collaborative modeling that can preserve intentions of collaborators within the model.

One method according to the present invention may include defining a first object. The first object may have a unique object identifier. The method may also include defining a second object. The second object may also have a unique object identifier. After the objects have been identified, the method may include receiving a first value and a second value associated with the first object. The method may also include representing either an agreement or a lack of agreement associated with the first object based on a relationship between the first value and the second value. In an alternative embodiment, both an agreement and a lack of agreement may be represented based on the first value and the second value. In one embodiment of the invention, the representation of an agreement and/or a lack of agreement may be performed internally, using, for example, hexadecimal or binary representations of agreement or a lack of agreement. Additionally, in some embodiments, the agreement or lack of agreement, as represented internally, may be represented visually to, for example, a user.

Additional embodiments may include representing an agreement based on an equivalence of the first value to the second value Alternatively, another embodiment may include representing a lack of agreement based on a lack of equivalence between the first value and a second value. In yet another alternative embodiment according to another aspect of the present invention, the method may include defining the first object and receiving a first value within a first single perspective model. Receiving the second value may be performed within a second single-perspective model.

In yet another embodiment, a method according to the present invention may include receiving a third value associated with the second object and receiving a fourth value associated with the second object. At least one of an agreement or a lack of agreement may be represented based on the received third and fourth values. In one embodiment, the first value associated with the first object and the third value associated with the second object may be received in a first single-perspective model. The second value associated with the first object and the fourth value associated with the second object may be received in a second single perspective model. In yet another embodiment of the present invention, the agreement may include an agreement about the identity of the first object. In an alternative embodiment of the invention, a lack of agreement and an agreement may be represented. The agreement may be, for example, about the identity of an object within the model, and the lack of agreement may be, for example, about a characteristic or characteristics of the first object.

A method of multi-perspective collaborative modeling according to one embodiment of the invention may include, defining a first single-perspective model. The first single perspective model may include an object and a value associated with the object. A second single-perspective model may also be defined. This second multi-perspective object may also include the object and may include a second value associated with the object. The first value and the second value may then be associated with the object to generate a multi-perspective model.

The method of multi-perspective collaborative modeling may include representing an agreement between the first single-perspective model and the second single-perspective model if the first value is equivalent to the second value. Alternatively, if the first value is not equivalent to the second value, lack of agreement may be represented between the first single perspective model and the second single-perspective model. Equivalence need not be limited to true mathematical equivalence and may include a determination that two strings are synonymous, or that an internal representation of a particular value is the same as an internal representation of another value. Equivalence as used herein is intended to include, for example, user-defined equivalence.

The present invention may also include processor-readable code stored on a computer-readable medium. The code may include code to define a first object and a second object. The first and second objects may be associated with a first and second object identifier, respectively. The code may also include code to receive a first value and a second value, each associated with the first object. Finally, the code may also include code for representing one of an agreement and a lack of agreement based on a relationship between the first value and the second value.

According to yet another embodiment of the present invention, processor-readable code may be stored on a processor-readable medium and may include code to receive a first set of data associated with an object. The object may have a unique object identifier. The code may also include code to define a first single-perspective model based on the received first set of data. The code may define the first single-perspective model using a single-perspective model syntax. The code may also include code to receive a second set of data associated with the object and may also include code to define a second single-perspective model using the single-perspective syntax. Additionally, the code may include code to group the first set of data and the second set of data using multi-perspective model syntax. The first set of data and the second set of data may be preserved by the multi-perspective modeling syntax. In one embodiment, the code may also include code for integrating the single-perspective modeling syntax and the multi-perspective modeling syntax with an underlying platform.

BRIEF DESCRIPTION OF THE DRAWINGS

While the specification concludes with claims particularly pointing out and distinctly claiming the invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures wherein:

DETAILED DESCRIPTION OF THE INVENTION

The present disclosure will now be described more fully with reference to the Figures in which embodiments of the present invention are shown. The subject matter of this disclosure may, however, be embodied in many different forms and should not be construed as being limited to the embodiments set forth herein.

Figure 1:
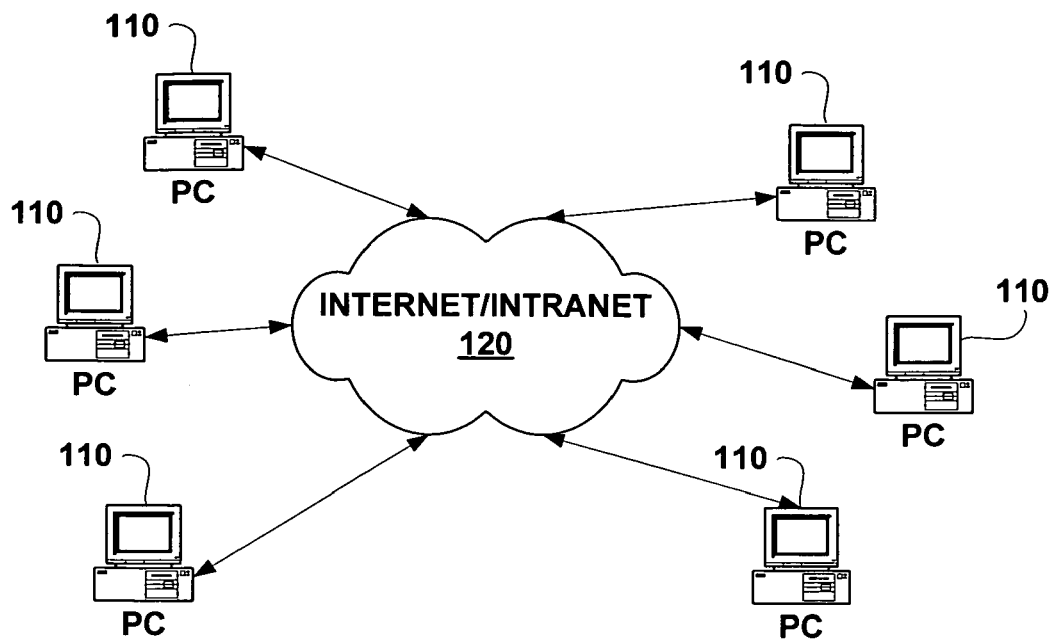
FIG. 1 shows a peer-to-per architecture that may be used in connection with a multi-perspective modeling system and method according to one embodiment of the invention.

FIG. 1 shows a peer-to-per (P2P) architecture that may be used in connection with a multi-perspective modeling system and method according to one embodiment of the invention. P2P architecture may include a number of personal computers (PC's) 110 that are connected to each other via an intranet or the Internet 120. Each one of the PC's 110 may include a locally-stored copy of a multi-perspective model, that is a combination of a number of single-perspective models created by the users of each of the PC's 110. In one embodiment, once one of the users of a PC 110 updates the model, the changes of the model may be seen by the users of the other PC's 110, as will be described in further detail below.

Figure 2:
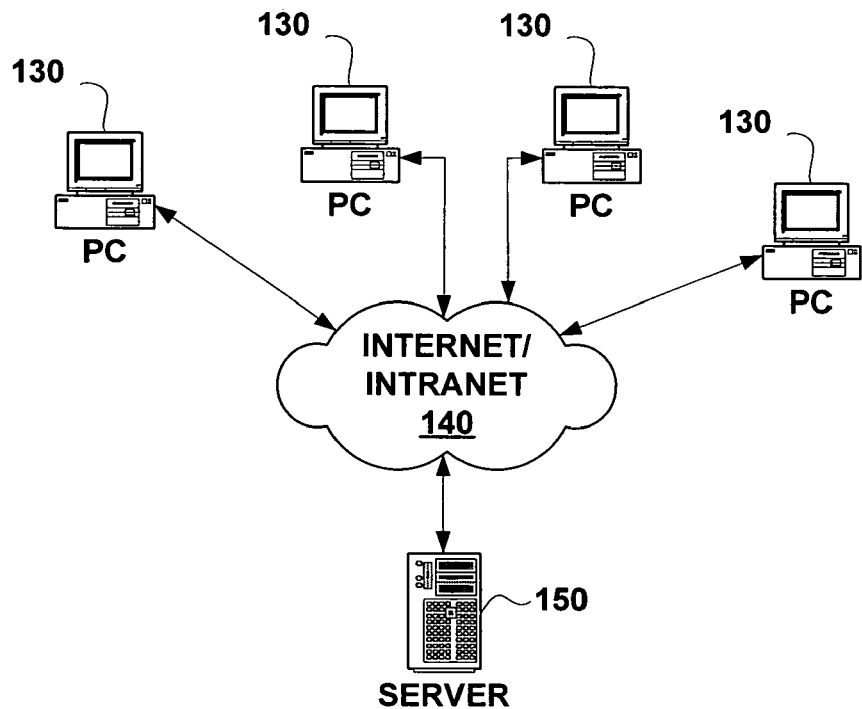
FIG. 2 shows an alternative architecture that may be used in connection with a multi-perspective modeling system and method according to another embodiment of the invention.

FIG. 2 shows an alternative architecture that may be used in connection with a multi-perspective modeling system and method according to another embodiment of the invention. In this embodiment, PC's 130 may be coupled to a server 150 over either an intranet or the Internet 140. In one embodiment of the invention, the server may include a copy of the collaborative model which may be updated periodically. Alternatively, the model located on the server may be updated each time on of the members of the collaborative community, which are using the PC's 130 updates their particular perspective of the model.

While FIGS. 1 and 2 illustrate differing embodiments for the implementation of multi-perspective modeling system, these figures are illustrative only, and one of skill in the art would realize that computers may be linked directly to one another, may be on a LAN, a WAN, or other backbone network. Alternatively, the computers may be networked to one another wirelessly. Any number of distinct configurations may be used so that collaborators within a collaboration community may exchange information with one another.

Figure 3:
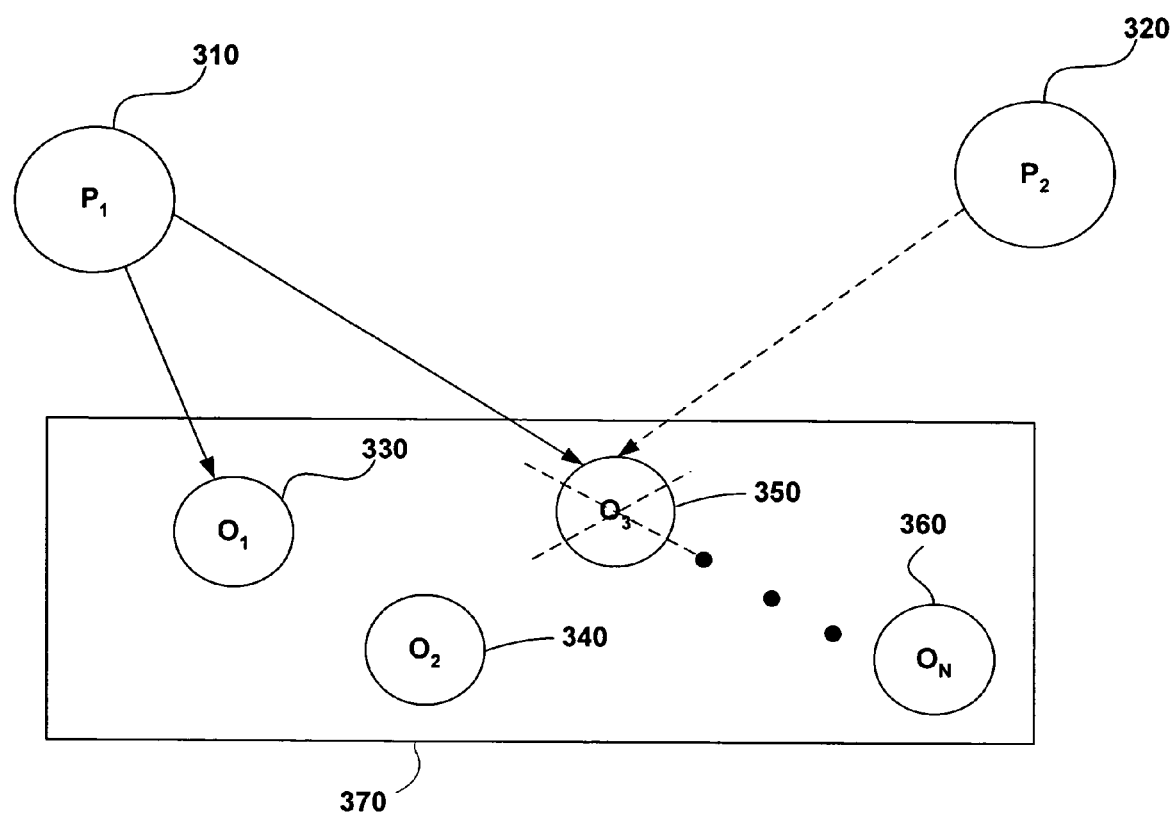
FIG. 3 shows a collaborative modeling system that exhibits intention violation.

As mentioned in the background of the invention, above, some conventional collaboration systems exhibit a problem known as intention violation. FIG. 3 shows a collaborative modeling system that exhibits intention violation. As illustrated in FIG. 3, two parties $P_1$ 310 and $P_2$ 320 may be collaborating regarding a model 370. The model may be, for example, a mechanical model or another engineering model. Alternatively, the model may be a business model, for example. Any type of a model may be used in connection with the invention. In the example illustrated in FIG. 3 the model 370 may have been created at an earlier point in time, and parties $P_1$ and $P_2$ may be making modifications to the original model 370.

In the embodiment depicted, the model 370 may have N objects, where N is a whole number integer greater than or equal to one. Thus, as illustrated in FIG. 3, model 370 includes objects $O_1$, $O_2$, $O_3$, ..., $O_N$, corresponding to item numbers 330, 340, 350, and 360, respectively. Party $P_1$ 310 may desire to change features or values associated with object $O_1$ 330 and $O_3$ 350. Likewise, party $P_2$ 320 may wish to delete object $O_3$ 350 entirely. Thus, an issue with intention violation may occur. If $P_1$ is permitted to alter the values of $O_3$, then $P_2$ will not be able to delete $O_3$, thereby frustrating the intention of $P_2$. If, however, $P_2$ is permitted to delete $O_3$, then $P_1$'s intentions are violated. The present invention seeks to correct this problem that occurs in traditional collaborative systems by permitting the maintenance of multiple perspectives within the models developed using the multi-perspective collaborative modeling of the present invention.

Figure 4:
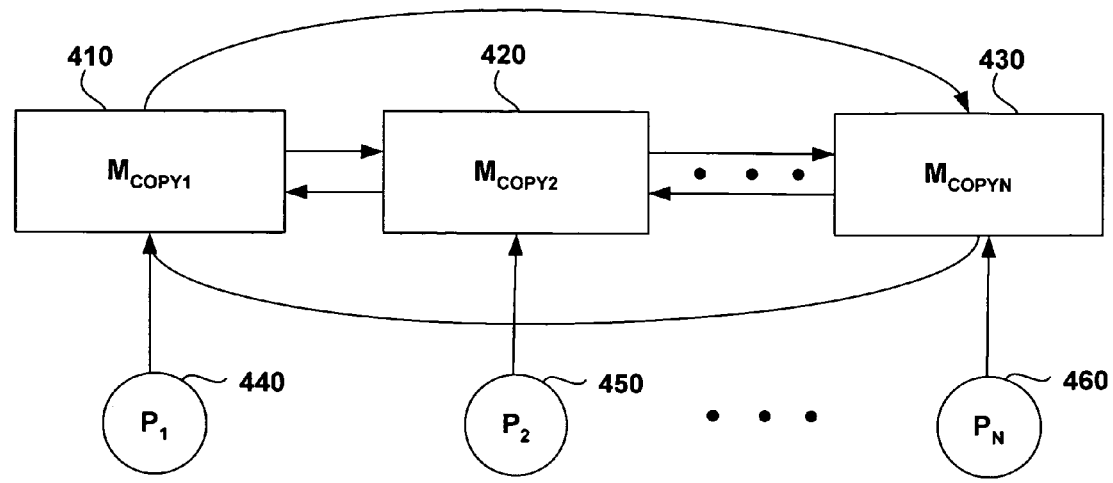
FIG. 4 shows a peer-to-peer collaborative modeling system in an online state according to an embodiment of the invention.

FIG. 4 shows a peer-to-peer collaborative modeling system in an online state according to an embodiment of the invention. The collaborative modeling system illustrated in FIG. 4 includes a number of copies of a particular model that is the basis of the collaboration. For example, in the embodiment illustrated in FIG. 4, there are N copies of the model that are distributed to N members of the collaborating community (P1-$P_N$). In this case, N is a whole number integer greater than zero. Each member of the community may have their own copy of the model. Therefore, for example, $P_1$, 440 may perform updates to their own copy of the model $M_{copy1}$, 410. Likewise $P_2$, 450 may perform updates to their own copy of the model $M_{copy2}$, 420. Finally, $P_N$, 460 may perform updates to their own copy of the model, $M_{copyN}$, 430. As each of the collaborating parties is online in FIG. 4, the updates of the model may be sent from one location to the other locations. These locations may be, for example, different workstations or personal computers. These locations may be within the same building, or may be in different cities or nations. Because of the distributed capabilities associated with P2P protocols, these locations may be anywhere in the world.

Figure 5:
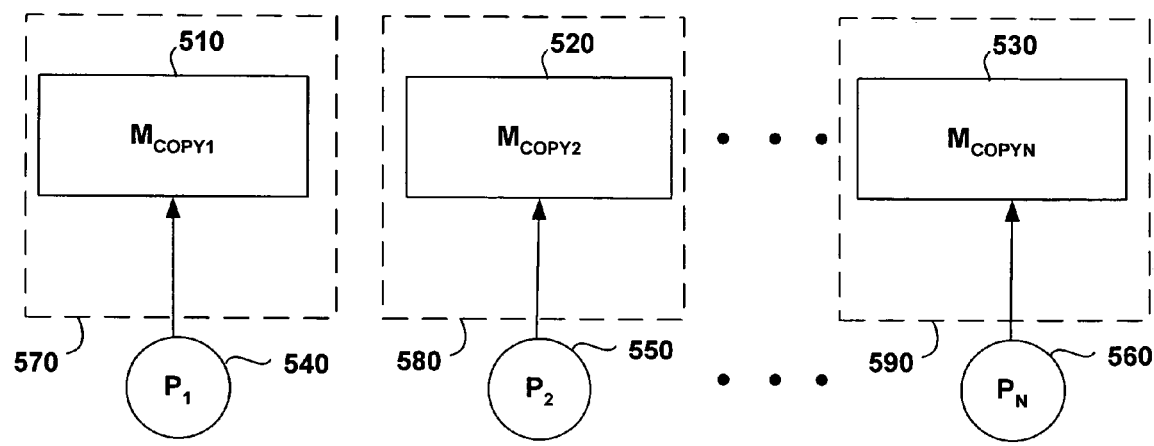
FIG. 5 shows a peer-to-peer collaborative modeling system in an offline state according to an embodiment of the invention.

FIG. 5 shows a peer-to-peer collaborative modeling system in an offline state according to an embodiment of the invention. Because each of the members of the collaborative community ($P_1$-$P_N$) are offline in the illustrated embodiment, changes that each of the members of the community make to their respective copies will not be seen by the others within the collaborative community. For example, if party $P_1$, 540 were to make changes to their copy of the model $M_{copy1}$, 510, the change will only be represented on their PC, which is isolated from the other PCs that may be within the community, as indicated by the dashed line surrounding $P_1$'s copy of the model 510. Thus, the other members of the collaborative community, $P_2$, 550 and $P_N$, 560 are not capable of receiving information relating to the updates within their respective copies of the models, 520 and 530, respectively. This is because their respective personal computers are isolated from $P_1$'s PC, as illustrated by the dashed lines 580 and 590 surrounding $P_2$ and $P_N$'s copies of the model, 520 and 530, respectively. The other parties within the collaborating community may not view any changes that any of the parties 540, 550, or 560 make to their copies of the model until they come back online. In some collaborative settings, the "true" state at many points in time will be a combination of FIGS. 4 and 5 with some parties online and some parties offline. Collaboration with this characteristic is often referred to as "asynchronous collaboration."

Figure 6:
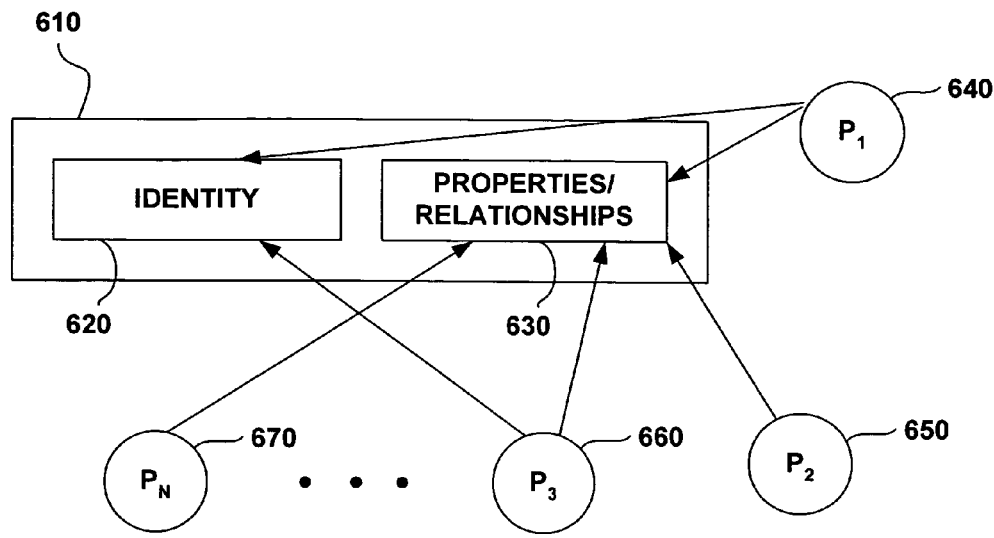
FIG. 6 shows a functional block diagram of a multi-perspective collaborative modeling system according to an embodiment of the invention.

FIG. 6 shows a functional block diagram of a multi-perspective collaborative modeling system according to an embodiment of the invention. As illustrated in FIG. 6, a number of parties ($P_1$, $P_2$, $P_3$, ..., $P_N$) may be members of the collaborating community, and each may have input with respect to certain aspects of the model 610. Thus, these parties may have a respective perspective with respect to particular objects within the model. Model 610 may include a number of different objects. These objects may include both an identity 620 and may further be characterized by properties and relationships 630 to other objects within the model 610. Members of the modeling community may input data, such as, for example, values associated with each of the objects.

As illustrated in FIG. 6, party $P_1$, 640 may input data associated with the identity of the object 620 and may input, for example, a value associated with at least one of the properties of the object or a relationship between the object and other objects within the model 630. Parties $P_2$ and $P_N$ may agree with the identity or existence 620 of the object, in the sense that it should be represented within the model. In other words, one or more of the parties may agree that a given object is relevant to the model and is therefore deserving of or appropriate for representation within the model. Thus, parties $P_2$ and $P_N$ may be said to agree on the existence of the object identified by 620 with party $P_1$, 640. Parties $P_2$ and $P_N$, may disagree, however, with the values or other properties or relationships 630 associated with the object, including its relationship or relationships to other objects represented within the model, and therefore, may enter their own perspectives regarding the properties associated with the particular object. Party $P_3$, however, may disagree with the existence of the object identified by user $P_1$ and may comment on this existence. This comment may be, for example, the deletion of the object from the model owned by $P_3$.

The embodiment of the multi-perspective collaborative system according to FIG. 6 may permit the parties in the collaborative community to agree on the existence of a particular object within the model prior to reaching an agreement on the properties or relationships 630 associated with the object. Once the parties to the collaboration have agreed on the existence of a particular object, as a baseline, they can then collaborate on the particular values. In this manner, a multi-perspective collaborative model my promote social values by permitting negotiations and discussions among members of the collaborative community to determine what the final or determinative value associated with an object in the model should be. This is further facilitated by the preservation of perspectives of all of the members of the collaborative community, as will be described in further detail with respect to FIG. 7.

Figure 7:
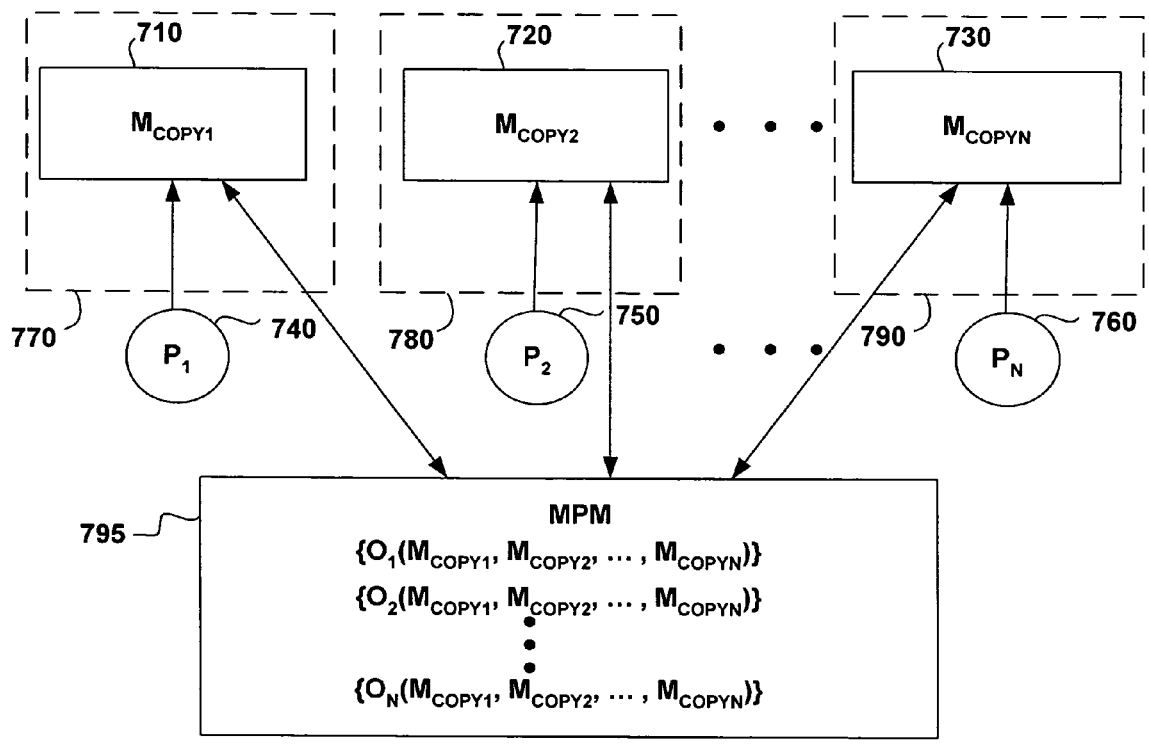
FIG. 7 shows a functional block diagram of a multi-perspective collaborative modeling system according to another aspect of the invention.

FIG. 7 shows a functional block diagram of a multi-perspective collaborative modeling system according to another aspect of the invention. As illustrated in FIG. 7, a number of parties ($P_1, P_2, \ldots, P_N$) 740, 750, and 760 may be part of the collaborative community. As discussed with respect to FIG. 5, each member of the collaborative community may have their own models ($M_{copy1}, M_{copy2}, M_{copyN}$), 710, 720, and 730 that may be isolated from one another by being stored on, for example, different computers, which are represented by dashed lines 770, 780, and 790.

As the first party P1, 740 inputs data into the copy of the model ($M_{copy1}$) 710 associated with $P_1$, the information may be maintained as a perspective in a multi-perspective model (MPM) 795. $P_1$ may provide information related to a first object $O_1$, which may be inserted into MPM 795, for example, as a value in a data field $O_1 \{ \ldots M_{copy1} \ldots \}$. The second party in the collaborative community may have a different perspective on, for example, a value to be associated with $O_1$, and this may be stored as, for example, $O_1 \{ \ldots M_{copy2} \ldots \}$. In the embodiment illustrated in FIG. 7, each of the parties may input data into their respective copies of the models, which may be represented within the MPM 795 such as, for example, data sets associated with each of the objects within the MPM 795. These data sets may have the form $O_N\{M_{copy1}, M_{copy2}, \ldots, M_{copyN}\}$, where N may be a whole number integer having a value of one or more. This data set is merely exemplary, and is used merely for the purposes of illustration. Any data structure for maintaining multiple perspectives of a number of parties within a collaborative community may be utilized in accordance with the systems and methods of the present invention.

Figure 8:
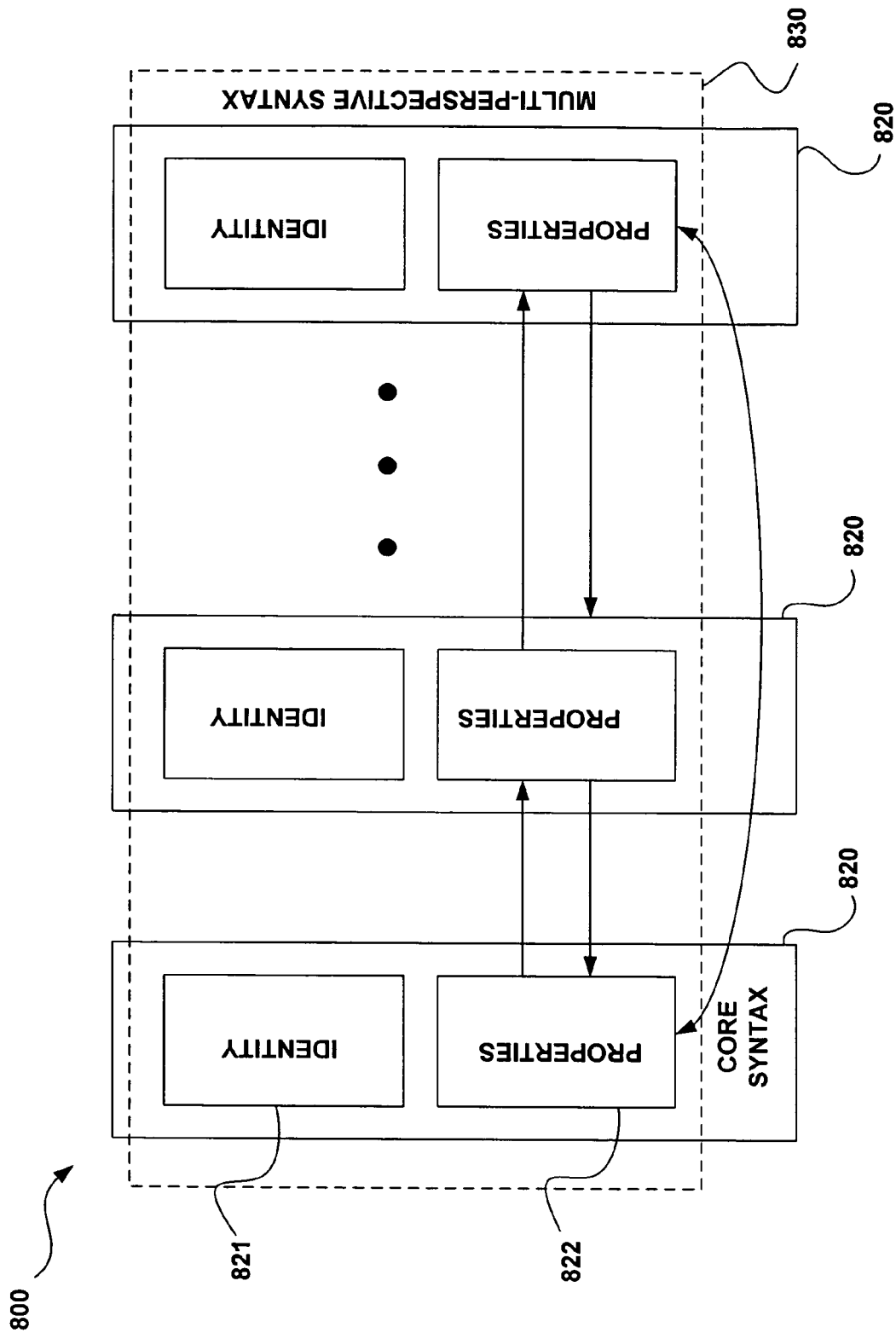
FIG. 8 shows a functional block diagram of a single-perspective syntax and a multi-perspective syntax for a multi-perspective collaborative modeling system according to one embodiment of the present invention.

FIG. 8 shows a functional block diagram of a single-perspective syntax and a multi-perspective syntax for a multi-perspective collaborative modeling system according to one embodiment of the present invention. The multi-perspective modeling system 800 according to one embodiment of the present invention may include core syntax 820 and a multi-perspective syntax 830 for constructing a multi-perspective model in accordance with the present invention. In one embodiment, the core syntax 820 may include software code for constructing multiple single-perspective models. The core syntax 820 may be configured to receive data associated with an object, such as, for example, an identity 821 of the object, and properties 822 associated with the object for a single perspective model. Core syntax 820 may be configured to describe various statements about what it is that is being modeled in a single perspective. On its own, the core syntax 820 may be, for example, a stand-alone single-perspective modeling syntax. The properties 822 of the object may also include information relating to, for example, a relationship of the object with other objects within the model. As illustrated in FIG. 8, the multi-perspective collaborative modeling system may also include multi-perspective modeling syntax 830, which may be in the form of software code. The core syntax 820 may not include any code enabling it to represent relationships among the various single perspective models. The multi-perspective syntax may include software code for representing one of an agreement and a lack of agreement regarding either the identity 821 of an object or the properties (or relationship with other objects within the model) 822 associated with the particular object in question. This representation may be, for example, a representation that is internal, or is unintelligible to the users. This representation may be some form of a binary or hexadecimal representation that represents to the software that there is either an agreement or a lack of agreement. Furthermore, the multi-perspective syntax 830 may be configured to ensure that multiple perspectives are maintained throughout the collaborative process. Each of the varying single-perspective models may be completely expressible by use of the core syntax 820 and may be conveyed as such to others participating in the larger collaborative effort. The multi-perspective syntax 830 may allow collaborators to establish relationships, such as identity and property relationships, between their core syntax model and the core syntax models of others. Multi-perspective syntax 830 may also allow collaborators to establish relationships between the core syntax models of other collaborators. It may also allow them to establish relationships among the objects and properties of any other single perspective core syntax model. Just as each individual has full control over what appears in their core syntax model, they also have full control over the statements they express within the multi-perspective syntax. For example, $P_1$ may state that her object $O_1$ has the same identity as $P_2$'s $O_2$. $P_2$, however, may not share this view; his model will not contain the assertion that $O_1$ and $O_2$ have the same identity unless he chooses to make that assertion within his model. In one embodiment of the invention, the various single-perspective views—which may comprise statements made in, potentially, both core and multi-perspective syntaxes—may be unique to the individuals that created them and therefore, may only be changed by those users.

Figure 9:
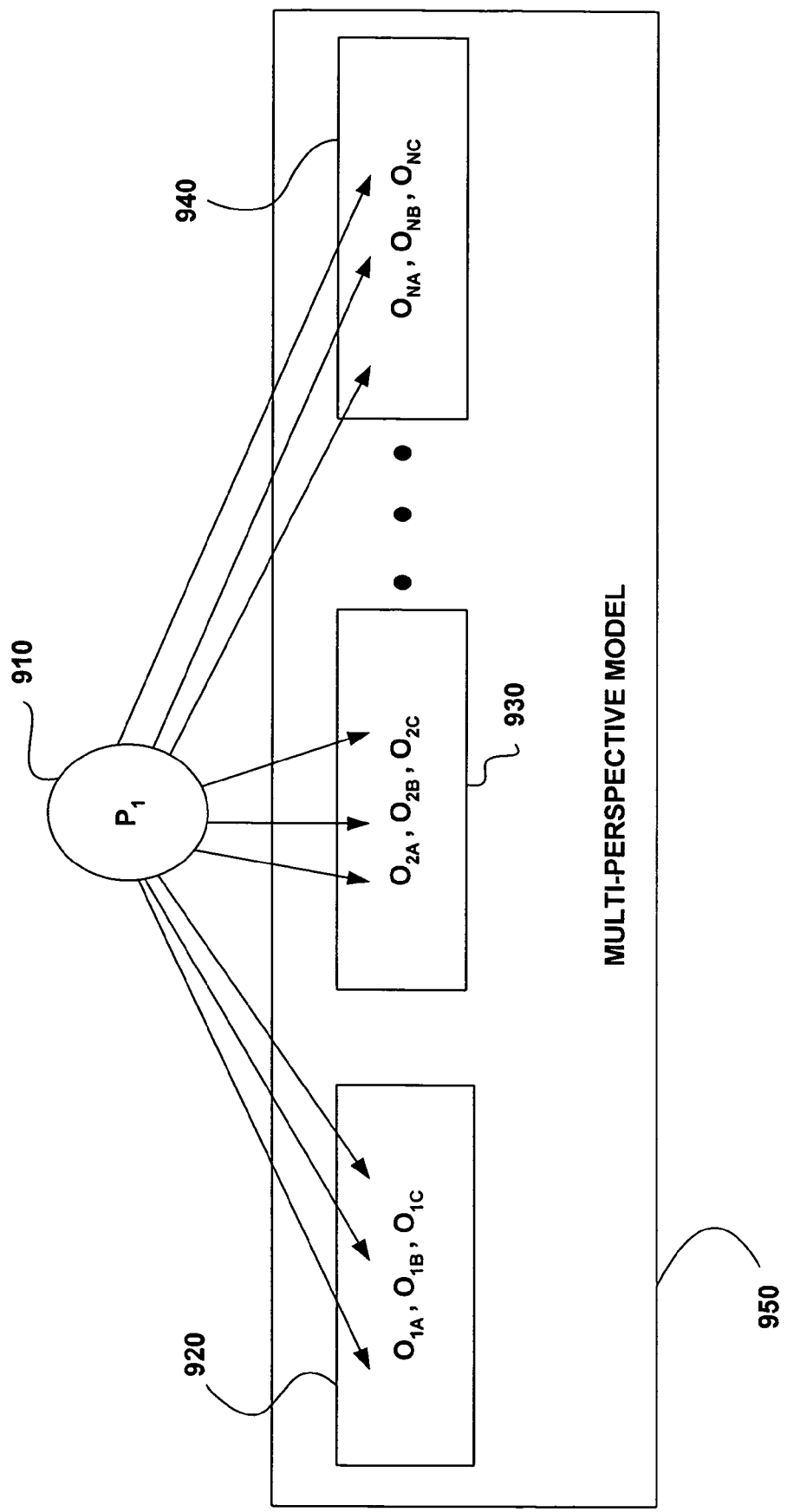
FIG. 9 shows a functional block diagram of a multi-perspective collaborative modeling system according to another embodiment of the invention.

FIG. 9 shows a functional block diagram of a multi-perspective collaborative modeling system according to another embodiment of the invention. The multi-perspective collaborative modeling system may include a single user, $P_1$, 910 that may have multiple perspectives relating to a number of different objects $O_1$-$O_N$, which are illustrated by boxes 920, 930, and 940, respectively. These objects 920, 930, and 940 may be located within a multi-perspective model 950. User P1 may have three various implementations of a particular thing being modeled within the multi-perspective model 950. These various perspectives are listed in FIG. 9 as perspective A, perspective B, and perspective C.

This embodiment may prove useful to maintain a number of different perspectives and permit removal of alternative and less desirable perspectives when the user determines that the perspective is no longer desired.

Figure 10:
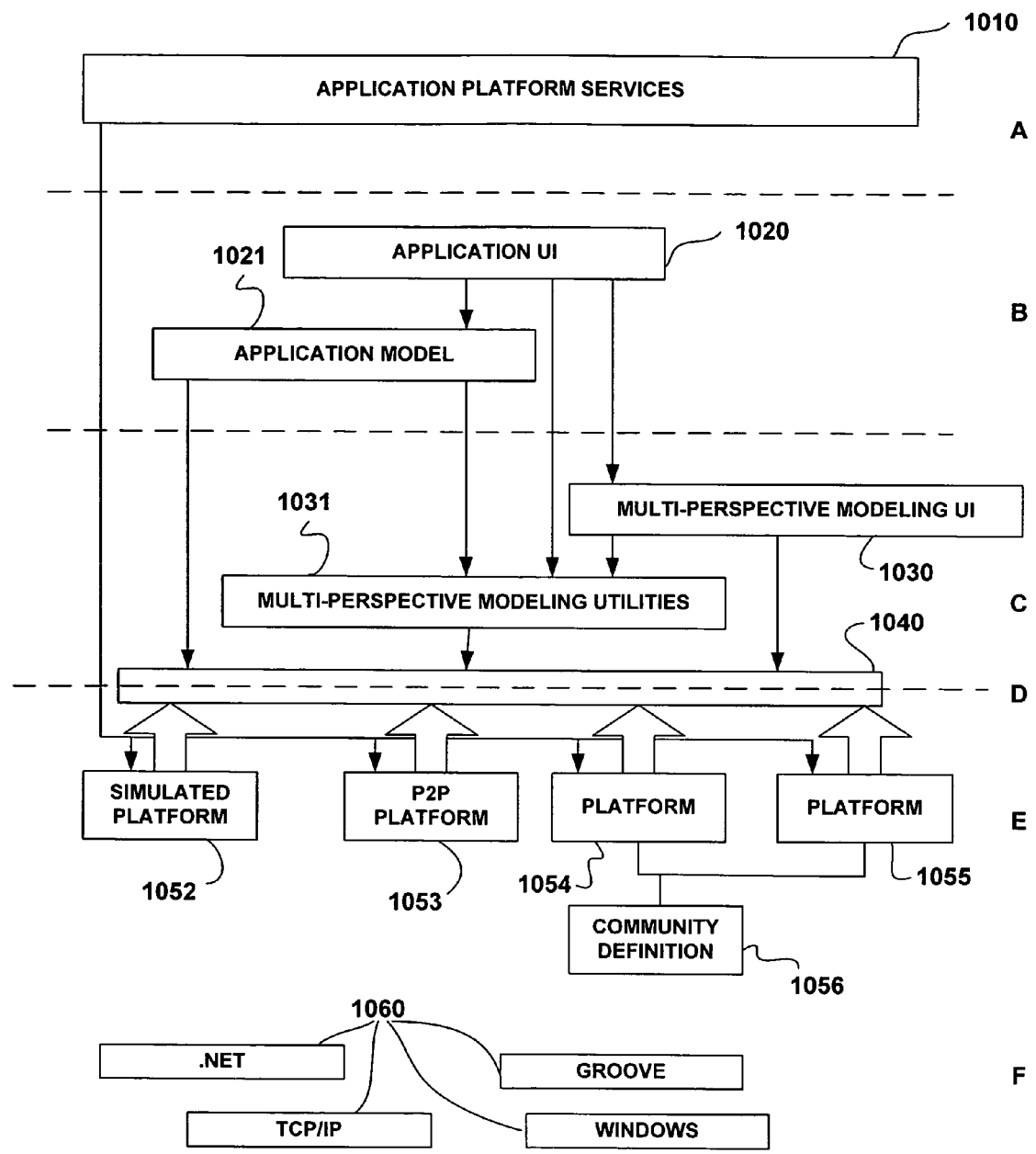
FIG. 10 shows a software architecture according to an exemplary embodiment of the invention.

FIG. 10 shows a software architecture according to an exemplary embodiment of the invention. The software architecture may include a number of different regions having different functionalities. The first layer or region within the architecture illustrated in FIG. 10 may be the application and platform dependent platform layer "A," or 1010. The second layer within the architecture illustrated in FIG. 10 may be an application dependent and platform independent layer, "B."

The following layer, "C" may be, for example, a layer that is completely independent of both the application and the platform. Below this layer in the architecture is the location of one or more of a number of various platform implementations, 1052, 1053, 1054, and 1055, which are included within layer "E." Layer "D", which is located between layers "C" and "E" may not be a per se software component in the sense of the other components in FIG. 10; rather, "D" may be a specification regarding how layers "C" and above interface to "D." "D" may be, for example, an abstract (language-independent) specification of the software calls that can be made by the components in "B" or "C" to access model data stored in "E." "D" specifies those services that "E" may provide when calls are made by "B" or "C," and it may specify how "E" is to respond to those calls. It is through this specification that a platform- and application-independent multi-perspective modeling architecture may be developed. Any platform that conforms to the specification can replace any other, for a given application. Put another way, in one embodiment, all that layers "B" and "C" "see" of layer "E" is that it responds appropriately to any call made to it. Therefore, it may not matter what actual platform is used to implement the generic multi-perspective modeling services defined by "D," the abstract specification. Conversely, any application may be paired with a given platform that fully supports the specification D. Layer "A," the application platform services, may need to be tied to the underlying infrastructure layer "F." Layer "A" may include information that may impact the UI, such as, for example, how the platform and application are initialized and configured, or how files are accessed and opened. It is these minimal sets of platform-specific details that are indicated by "A," and it is for this reason that there is a line connecting "A," and "E." The platforms in layer "E" may interface with the underlying systems illustrated in layer "F." Platforms may include, for example, software that would be developed to work with particular underlying infrastructures, such as the examples indicated by 1060. An appropriately matched and integrated pair from E and "D" may, together, provide (at a minimum) the services specified within "D." The reason why the examples of "E" are tied in name to specific underlying infrastructures is pragmatic: Generally speaking there are so many idiosyncratic specifics in how data is stored and accessed within elements of "F" that any implementation of "E" must address those specifics, and thus will be idiosyncratic itself. To put this in other terms: Those elements above "D" including "B" and "C," are those that can be separated from the underlying infrastructure. Those elements below "D" and layer "A" may not be configured to be separated from the underlying infrastructure.

The architecture illustrated in FIG. 10 permits the multi-perspective modeling system to be independent of both the particular application and the underlying infrastructures associated with running those applications. Layer "D" may define the services that comprise a multi-perspective modeling system. Layers above "D" may define new services (layer "C") and applications (layer "D") independently of how those services are provided. Layer "E" may embody software code that provides the services of layer "D" independently of additional services built on top of it as well as any applications that make use of it. Layer "E" may be configured to provide these services by making use of layer "D." Layer "E" may provide these services by making use of services already present in the infrastructure on which the software operates. As illustrated in FIG. 10, each layer "A"-"F" relies on the layers below it in a hierarchical manner.

The bottom-most layer, "F," may include preexisting software packages 1060, and include, for example, .NET, TCP/IP, Groove®, and Windows-based systems. There are a number of other preexisting systems that the multi-perspective collaborative modeling software may interface with, given that appropriate matched platforms have been developed. The multi-perspective collaborative modeling software according to the present invention may be configured to interface with any existing infrastructure.

Above the infrastructure layer "F," includes the multi-perspective collaborative modeling platform implementations, "E." A platform may include, for example, software code that is configured to provide multi-perspective modeling services. Minimal services provided by a platform may be defined by the layer "D" specification. The services may be provided in many different ways, such as, for example, through a client-server system, a peer-to-peer network, by simulation or by a central database. The platform may make use of any infrastructure and communication services in order to provide distributed multi-perspective modeling services. Furthermore, there may be different platforms that provide these services using different infrastructures, such as .NET, Windows, Macintosh, TCP/IP, or other software codes. In this manner, the platforms may be analogous to translators that permit the multi-perspective modeling system and software to communicate in the correct language with the underlying infrastructures 1060.

In an alternative embodiment, the platform may include a number of additional services and capabilities that may be implemented. These services may include the ability to create new models, to send messages or email directly to other users, to determine if other users are currently online, to determine information about others, to perform administrative tasks with respect to users and models and so forth. There is no limit to the number of additional services that a platform may provide in addition to that required by layer "D". Some of these services may be used by the Application Platform layer "A".

In one embodiment of the invention, the multi-perspective modeling software does not include any code, but instead has a number of predetermined interface declarations, layer "D," that may be configured to describe the services that the multi-perspective modeling platform will provide and the means by which the layers above layer "D" may access those services. These declarations define the essential services and capabilities of multi-perspective modeling in general independent of platform implementations, infrastructure, or applications for which it will be used. The layer above the multi-perspective modeling abstract layer may include application and platform independent tools, which may include, for example, a number of predetermined utilities 1031. In one embodiment of the invention, these utilities may be configured to perform analyses using the multi-perspective models. One example of an analysis that may be performed using multi-perspective modeling utilities may include, for example, clique determination. A clique may include a set of perspectives that may be associated with users that all agree on the value or other property (e.g., the object's relationship with other objects within the model) of an object. A clique analysis of an object may include listing the object's unique values and the sets of users that agree to those values or other properties. A similarity analysis, as another example, gives a measure of the similarity of two models based on, for example, an algorithmic computation of agreements within a model.

In another embodiment of the invention, layer "C" may include a multi-perspective modeling user interface (UI) 1030 that may contain useful UI components that are applicable over all of the supported infrastructures 1060. In one embodiment, these multi-perspective modeling UI components may include simple display elements. Alternatively, these multi-perspective modeling UI components may include, for example, sophisticated rendering engines such as, for example, an extensible stylesheet language (XSL) rendering engine. Such an engine may be configured to transform a document written in XML to a document written in HTML using one or both of extensible sytlesheet transformations (XSLT) and extensible style formatting objects (XSL-FO), which may permit rendering in an underlying format, such as, for example, PDF format. Any type of UI components may be included in the multi-perspective modeling UI component code 1030, as long as the components may be used in conjunction with a number of different infrastructures. As illustrated in FIG. 10, the multi-perspective modeling UI components may rely on the abstract multi-perspective modeling software. In one embodiment, there may be multiple libraries of multi-perspective modeling UI components 1030, each of which may be configured to interface with one or more different underlying infrastructure 1060.

Application component layer "B" may be built above layer "C." As is illustrated in FIG. 10, the application component layer may rely both on the multi-perspective modeling tool layer "C" and the abstract platform layer "D" itself. In one embodiment of the invention, there may be two individual components within the application layer. The first component may include application model components 1021. The second component may include the application UI components 1020. In one embodiment, the application model components 1021 and the application UI components 1020 may be dependent on the application used, but independent of the platform. They interact with any predetermined type of platform through the abstract interface, 1040. Thus, according to one embodiment of the invention, the application model components 1021 and the application UI components 1020 may be reused for any predetermined type of platform.

At the top of the hierarchy are the application platform services layer "A." The application platform services 1010 may be configured to mange processes associated with the initialization and configuration of the platform and the application. In one embodiment, the application platform services 1010 may be responsible for instantiating the actual platform object, or perhaps allowing the user to choose among several platforms. In yet another embodiment of the invention, the application platform services 1010 may provide platform-dependent services to the application in a manner that suits the application itself. This may include, for example, creating new models, locating models (e.g., so that a user may open the model), deleting models, to name a few. Numerous other functions may be performed by the application platform services 1010. In one embodiment of the invention, the application platform services 1010 may be provided by, for example, enabling the application to call up to the top layer. Each different implementation of, for example, a different utility, may require a different application platform services object. In the embodiment illustrated in FIG. 10, the application platform services 1010 may be configured to access the platform directly because the access may be needed to instantiate and activate the particular platform being used. In yet another embodiment of the invention, the actual platform may be divided into components. These different components may be configured to, for example, manage the user community, coordinate peer updates and access a local repository. The nature of the platform may dictate the nature of these components.

While particular software architectures and variations of those architectures have been explicitly described by way of example and with reference to FIG. 10, this discussion is not intended to be by way of limitation. Various data structures and layers may be provided to implement various portions of the architecture. For example, various aspects of the architecture may be integrated and consolidated. Alternatively, additionally features and interfaces may be required depending on the underlying infrastructure.

Figure 11A:
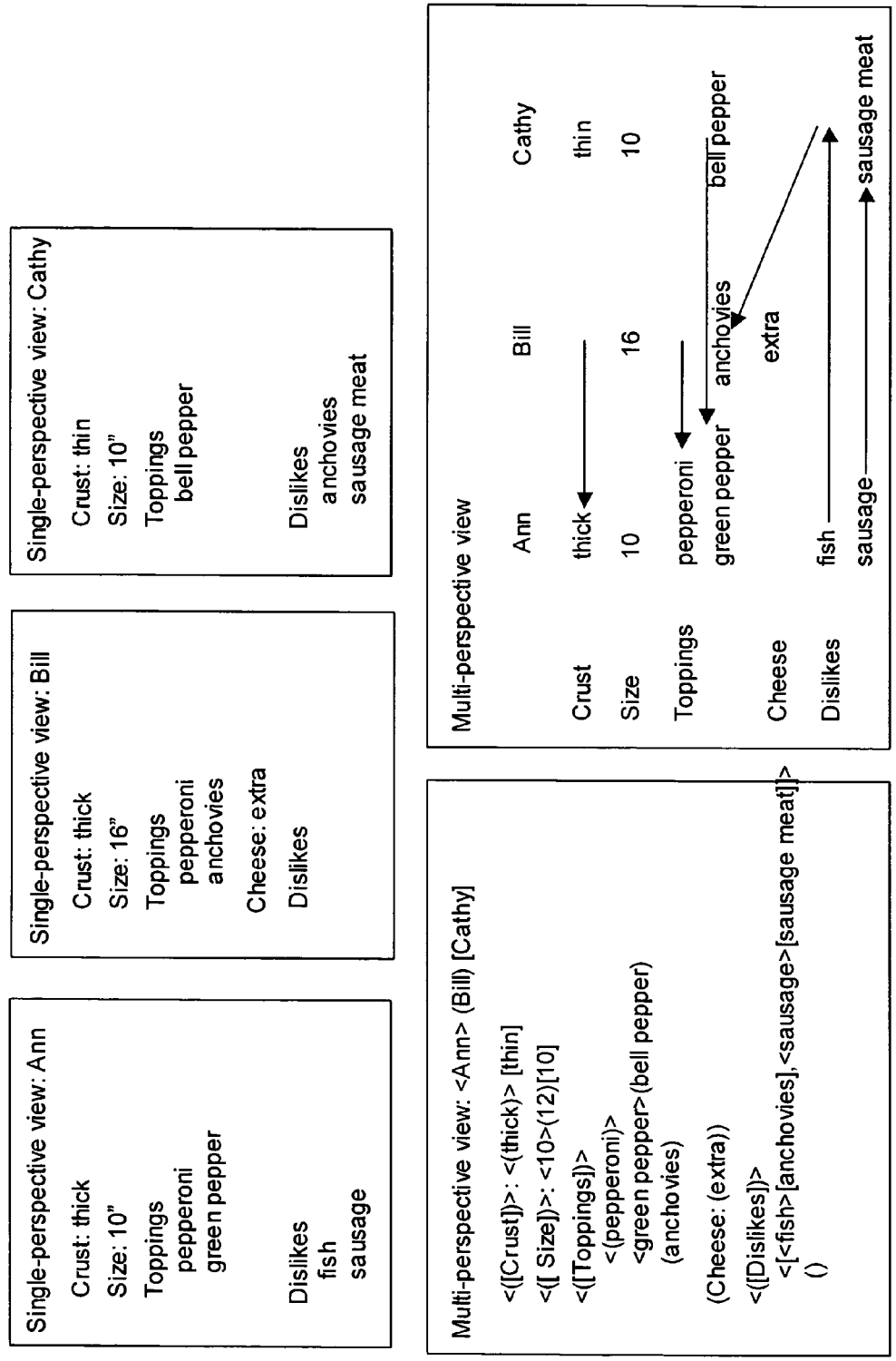
FIGS. 11A-C show an example multi-perspective model and how it is represented at three different layers within the architectural model depicted in FIG. 10, according to an embodiment of the invention.
Figure 11B:
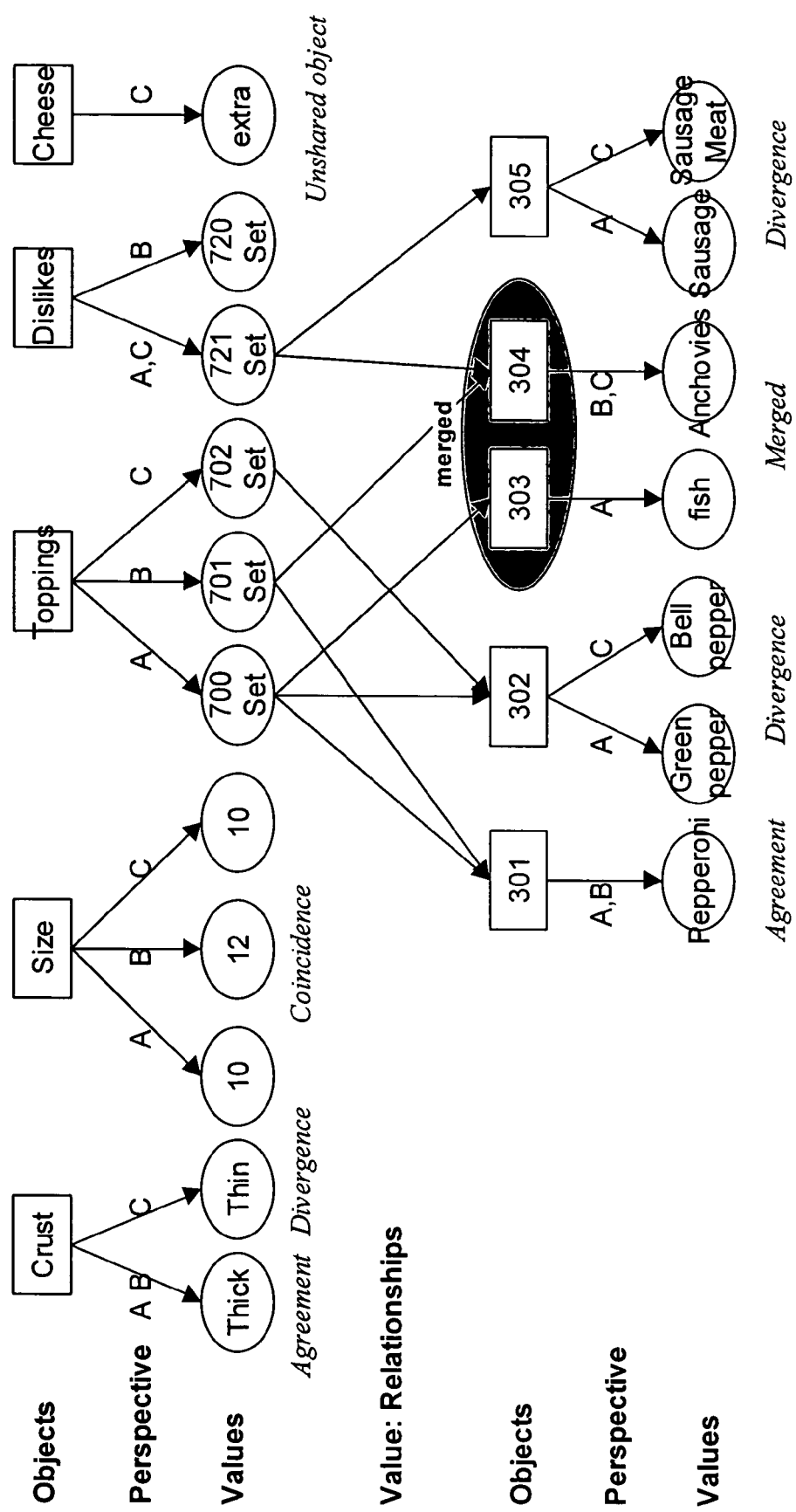
Figure 11C:
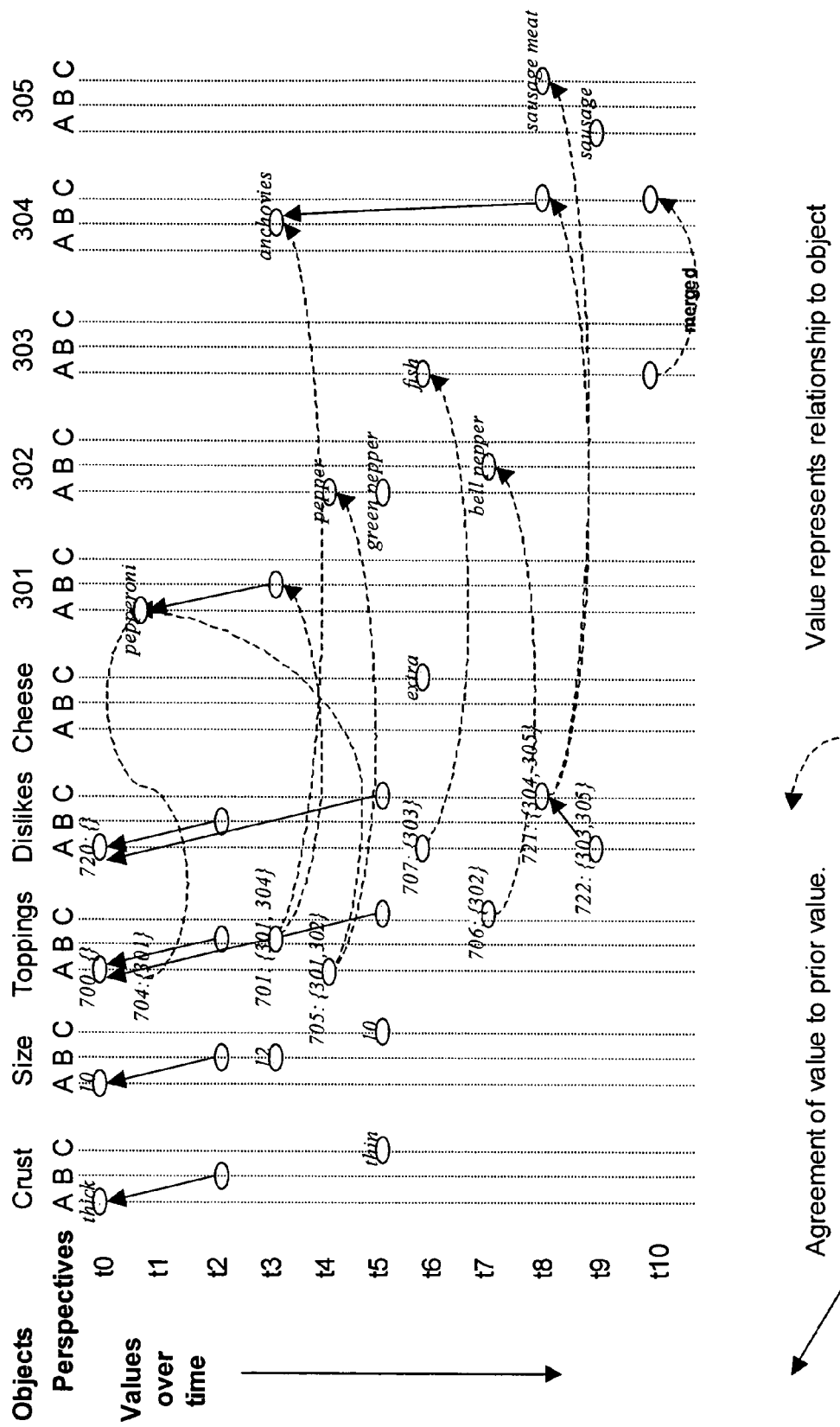

FIGS. 11A-C show an example multi-perspective model and how it is represented at three different layers within the architectural model depicted in FIG. 10: FIGS. 11*a* and 11*b* show the model at the Application UI and Application Model regions of layer "B"; FIG. 11*c* shows the model at the Abstract Specification layer "D" and FIG. 11*d* shows the Platform Implementation layer "E." Each layer may be configured to structure and enhance the information related to the multi-perspective collaborative modeling system so as to provide services to the layers above while relying on the layers below it. At layers "A" through "D" the specific binary encoding of the model may not be relevant because it is mediated by the software development system (e.g., .NET).

FIG. 11A shows the model at the Application UI layer ("B" upper). It is presented as three single perspective views, those of Ann 1510, Bill 1520, and Cathy 1530, and two multi-perspective views 1540 and 1550. The single-perspective views each show the portion of the model defined by the named perspective (i.e., the single perspective model of each of the members of the collaborative community) and no agreements among the views are shown. The multi-perspective views 1540 and 1550 show different representations of the different perspectives' notions of the existence of different objects and their properties. In particular, multi-perspective view 1550 shows that the values used by some perspectives exhibit deliberate agreement with those from other perspective and not simply coincidence of value. This example is in no way intended to present an optimal UI. This example is merely for illustrative purposes as it shows a multi-perspective model in a very simplistic manner.

FIG. 11B shows the model at the Application Model layer ("B" lower). It shows how the Application Model may be composed of objects, values, and relationships between objects and values. As illustrated in FIG. 11B, the relationships may show, for example, a number of different interrelationships between perspectives of the users including: which perspective agrees to the existence of which objects, what value each perspective assigns to each object, which values represent aggregations of objects, and which objects, through identified distinctly, have been deemed equivalent. For illustrative purposes, FIG. 11B s is annotated with specific categories that are presented by the different relationships.

As illustrated in FIG. 11B, the application model layer may be established in a hierarchical fashion with objects having lower granularity at the top of the model and objects and values associated with those objects of higher granularity at the bottom of the architecture. These object layers may include, for example, a data structure including one or both of a unique object identifier number and a pointer associated with the individual perspectives. Therefore, the object may include both an identity and an agreement and/or a lack of agreement. For example, as illustrated in FIG. 11B, Ann ("A"), Bill ("B"), Cathy ("C"), may develop a model based on their preferences associated with pizzas. At a lowest level of granularity, all parties may agree that objects 1610, may include crust, size, toppings, dislikes, and cheese. Arrows illustrate the perspectives 1620 of the different modelers. In situations in which there are only a few choices, a developer may chose to have only one level of granularity, as illustrated by the choice of crust (i.e., only a choice between, for example, thick or thin). In situations in which the developer realizes that there may be groupings of properties, such as, for example, as may occur with pizza toppings, the developer may have a higher-granularity object layer. As the granularity increases, the specificity of the objects may increase.

As illustrated in FIG. 11B the values 1620 associated with objects 1610 may include sets of data associated with a group of objects. In the example illustrated in FIG. 11B, each modeler A, B, and C may have a unique set of topping preferences. Each of these sets of preferences may be linked via value relationships 1640 to objects associated with particular toppings, 1650. These objects may take on specific values 1670, such as for example, pepperoni, green pepper, bell pepper, fish, anchovies, sausage, and sausage meat. As illustrated in FIG. 11B, and described in detail above, various modelers may wish to merge or declare certain values as being equal. In this example, the modelers may have associated fish and anchovies as being equal. This may be done within a single perspective model. Alternatively, this may be performed by a particular modeler within models of other members of the community. By having various levels of granularity, an opportunity exists for the parties to agree to certain aspects of the model on more general levels prior to reaching specifics, thereby potentially assisting in the social aspects of collaboration.

FIG. 11C shows the model at the Abstract Specification layer "D." The representation that is presented here may be retrieved from, for example, any Platform Implementation "E." This layer also illustrates the evolution of the model over time. Successive updates to a value are represented by new identifiers (e.g., 705, 706, etc.). These representations may be represented in a number of different ways. The value of an object at any point in time may be, for example the value of the nearest earlier value, or "null" if there is no prior value or change. By keeping track of the time changes within the model, the collaborative community may determine when particular changes were made. Representations of the time associated with new information being input into a particular user's single perspective model may be represented both internally, and externally, for example through a UI or the like.

Figure 12:
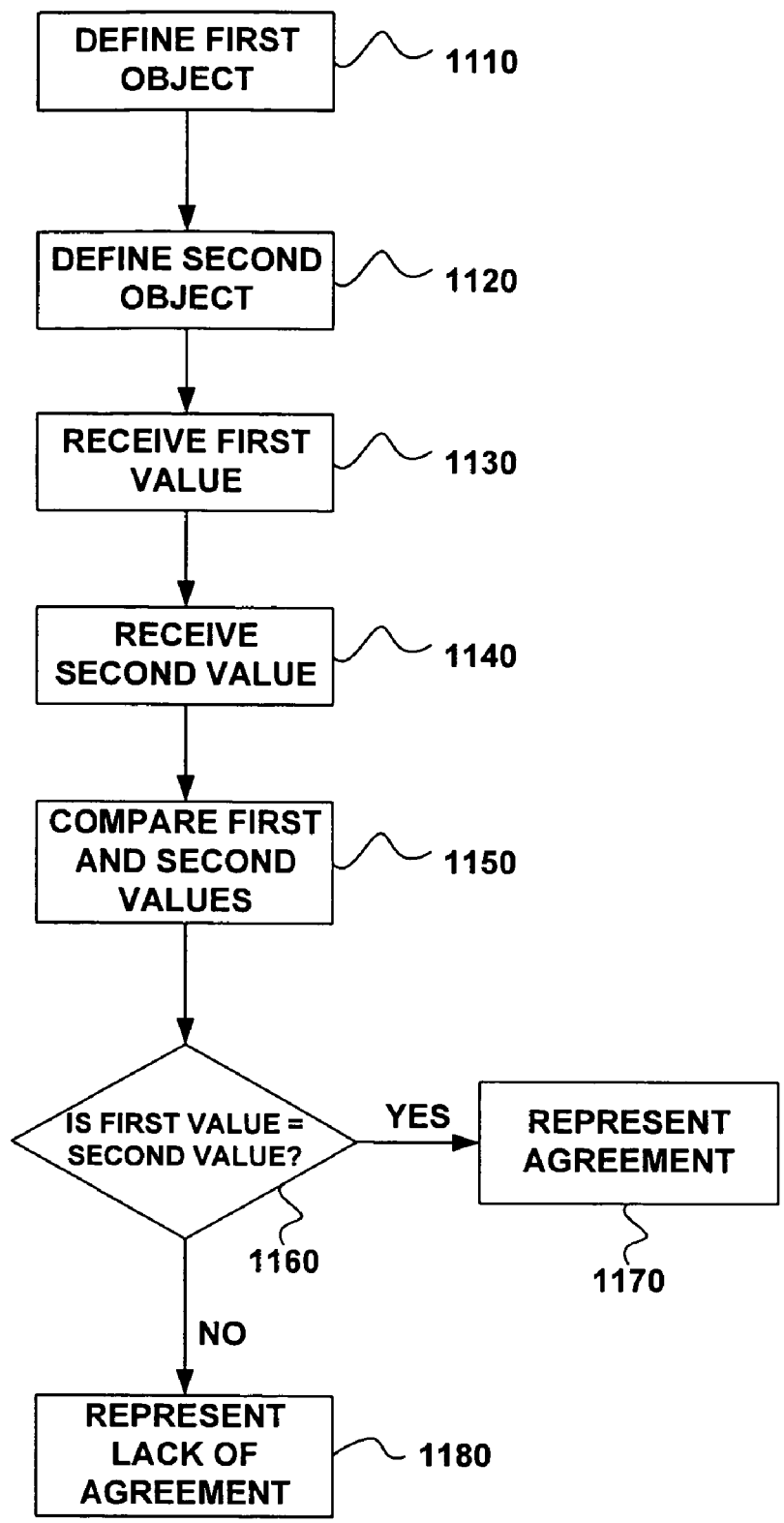
FIG. 12 shows a flow chart of a method of multi-perspective collaborative modeling according to one embodiment of the invention.

FIG. 12 shows a flow chart of a method of multi-perspective collaborative modeling according to one embodiment of the invention. A method of multi-perspective modeling may include defining a first object 1110. Defining a first object 1110 may include providing information relating to the identity of an object within a multi-perspective model. The first object may be defined within a single perspective model and may be given a unique identifier. The unique identifier may include, for example a string of letters or numbers. In one embodiment, the unique identifier associated with the object may be a hexadecimal number. In an alternative embodiment, the unique identifier may be a binary number. The unique identifier may be any sort of an identifier so that the multi-perspective modeling system may recognize the object. In one embodiment, the identifier may also be associated with the particular member of a collaborative community that originated the particular object.

After a first object has been defined, a second object may likewise be defined 1120 in a similar manner as the first object. This second object may also include a unique identifier which may take any number of different forms. The second object may be defined 1120 by the same member of the collaborative community that defined the first object 1110. Alternatively, another member of the collaborative community may define the second object 1120.

A first value may be received 1130. The first value may take a number of different forms, and may be associated with the first object. For example, in one embodiment of the invention, the first value may include a string of letters or may constitute a string of words or text. Alternatively, the value associated with the first object may include a number or a set of coordinates. Depending on the particular application, the value associated with the first object may take on a number of different forms. In one example, if the first object was a mass coupled to a pulley, the value may be, a weight of the mass, such as for example, 20 kg. If the first object were a location in two dimensional space, the value may be an ordered pair of numbers defined in two dimensional space taking the form (x,y). Additionally, the first value may be a word or a string of words. This first value may be associated with the first perspective associated with the object.

After the first value is received, a second value may be received 1140. The second value may be associated with the first object. In many of the embodiments of the present invention, the second value may take the form of the first value. This means that, if the first value is, for example, an ordered pair of numbers, the second value, also associated with the first object may also be an ordered pair of numbers. This second value may be associated with a second perspective.

The first value and the second value may then be compared 1150. A determination may be made to see if the first value and the second value are equal 1160. This determination may be made, for example, by a particular user determining whether two values (such as properties) are equivalent or otherwise equal. This equivalence may depend on the nature of the model. For example, in some applications, "CAR" is not equal to "Car." But in others "CAR" may be equal to "Automobile." In some applications 1.32 may not be equal to 1.322, but in others it may be. Therefore, in an alternative embodiment, multi-perspective applications may include features in which automated comparisons can be performed to determine equality. In yet another embodiment, the particular application may permit a user to determine if they want to automatically determine equality (e.g., allowing the modeling application determine equality) or manually determine quality. This may give users added flexibility particularly when they may be dealing with a number of different types of models, some of which lend themselves to automatic equivalency determinations, and some of which do not. If the first value and the second value are equal, then the multi-perspective collaborative modeling system may be configured to represent an agreement 1170. This agreement may be, for example, an internal representation of the agreement. Alternatively, the representation may be an external representation of the agreement. If the first value is different than the second value, the multi-perspective collaborative modeling system may be configured to represent a lack of agreement 1180. This representation of a lack of agreement will be an internal representation of a lack of agreement 1180. Alternatively, the representation may include an external representation of the lack of agreement which may be based on the particular internal representation. An external lack of agreement may include a visual lack of agreement or other peripheral device output indicating a lack of agreement.

Figure 13:
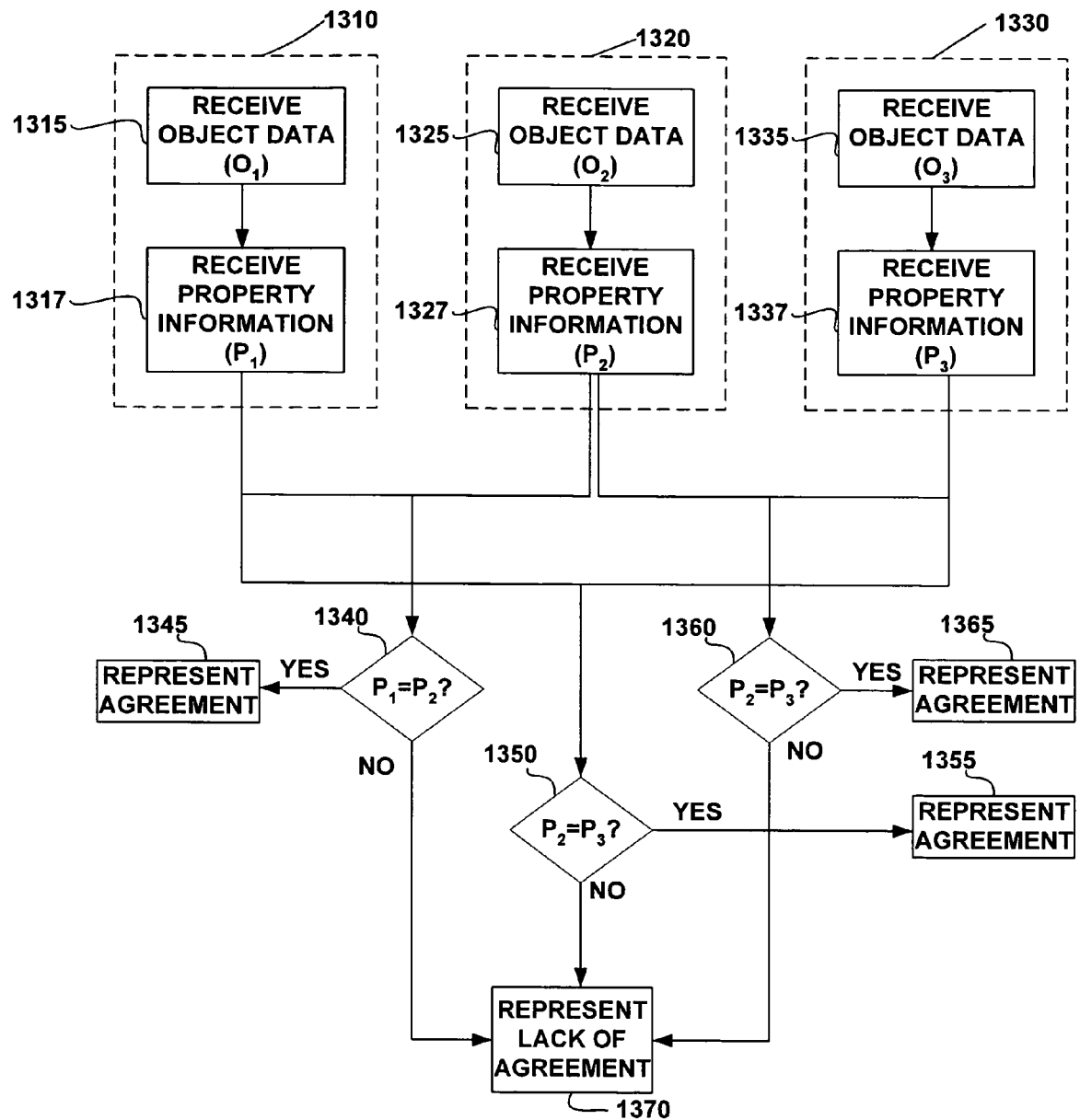
FIG. 13 shows a flow chart of a method of multi-perspective collaborative modeling according to another embodiment of the invention.

FIG. 13 shows a flow chart of a method of multi-perspective collaborative modeling according to another embodiment of the invention. A first single-perspective model may be defined, step 1310. This may include receiving object data $O_1$, step 1315 and property data $P_1$, step 1317 associated with the first object. A second single-perspective model may also be defined, step 1320. The second single perspective model may be defined, step 1320 by receiving object data, step 1325 and receiving property information, step 1327. In another embodiment, a third single-perspective model may be defined, step 1330. Defining a third single-perspective model, step 1330 may include receiving object data, step 1335 and property information, step 1337. In one embodiment, the object data received in steps 1317, 1327, and 1337 may refer to the same object. In this embodiment, the multi-perspective collaborative system may be configured to represent an agreement as to the identity of the object. This agreement as to the identity of the object may be performed manually by modelers determining that another member is referring to the same object and incorporating that object into their own single-perspective model. Alternatively, the multi-perspective collaborative modeling system may include a means for automatically identifying similarities between objects within individual single perspective models and representing an agreement between two or more members within the collaborative community.

In the embodiment illustrated in FIG. 13, it is presumed that each of the independent members of the collaborative community have agreed as to the identity of the object. However, the multi-perspective collaboration system may be configured to determine if the parties to the collaboration agree as to the properties associated with the object. In one embodiment, the modeling software may be configured to compare the values to determine if they are the same. Alternatively, this may be performed manually by a user, who has the choice of whether to adopt another perspective or not. The comparison of the first property ($P_1$) and the second property ($P_2$), each of the properties being associated with a particular single-perspective model, step 1340 may include determining if the values are the same. If a value associated with the first property and the value associated with the second object are the same, then the software may be configured to represent an agreement, step 1345. If value associated with the first property and the value associated with the second object are different, then the software may be configured to represent a lack of agreement, step 1370. This process may be repeated for the second property and the third property, step 1350, and the first property and the third property, step 1360. If either of these values are identical, then the software may be configured to represent an agreement, steps 1355 and 1365.

In one embodiment, if the object defined by the first party is the same as the object defined by the second party, once an agreement as to the existence of the object is made, the multi-perspective collaborative system may be configured to adopt one of the unique identifiers to be associated with the agreed upon object. Alternatively, the multi-perspective collaborative system may include a data structure configured to associate the unique identifiers with identical objects. For example, if a first object has a first identifier and the second object has a second identifier, different from the first identifier, a data structure may be configured to associate the first identifier with the second identifier, so that replacement or redesignation of the unique identifier numbers is not necessary. The representation of agreement, 1345, 1355, 1365, and 1370, may be contained within the multi-perspective syntax of individual perspective models. Thus there is no requirement that they be shared among (or forced upon) others' models.

While the preceding sections describe several embodiments, they are not meant to limit the scope of the invention in any way. It will be apparent to those skilled in the art that various modifications and variations can be made in the apparatus and methods of the invention without departing from their spirit and scope.

For example, while the various embodiments of the invention were described as having only a few number of distinct objects, tens or hundreds of objects each having a large number of properties are possible. For example, particularly when dealing with complex models, one hundred objects may include various numbers of properties that may be defined, such as, for example, the location, mass, materials, type, position, and tolerances may be utilized as properties. Also included within the properties of the object may be the relationship of the object within the model to other objects within the model. Furthermore, many models may be algorithmic or computational. Multi-perspective modeling may be applied to the algorithms or computations, as well as to the input values that are taken in by these sorts of models, from which output is produced. It is possible, using the aforementioned system and methods to have multiple perspectives regarding the algorithmic or computational specifications—or have multiple-perspectives on some exposed variables that determine underlying algorithmic or computational specifications—embodied within a model. Because of the increasing complexity that is faced when diagramming more complex models, for ease of discussion and understanding of the invention, the models have been the most simple models possible. It is to be understood that the invention is not to be limited to a particular type or form of model, as anything may be modeled in accordance with the systems and method of the invention.

What is claimed is:

1. A method for collaborating on perspectives of an object, the method being executed on electronic computer hardware in combination with software, comprising:

identifying an object;

receiving a first set of parameters for the object, said first set of parameters representing perspectives of a first participant;

receiving a second set of parameters for the object, said first set of parameters representing perspectives of a second participant;

comparing the first set and second sets of parameters to identify points of agreement and points of lack of agreement between the first and second set of parameters;

merging the points of agreement between said first and second set of parameters from the comparing step;

preserving points of lack of agreement between said first and second set of parameters from the comparing step; and visually presenting a multi-perspective model of the object, the visual presentation of the multi-perspective model displaying together the points of agreement as merged from the merging step and the points of lack of agreement as identified in the comparing step and preserved in the preserving step.

2. The method of claim 1, wherein said first and second set of parameters provide values associated with the perspectives.

3. The method of claim 2, wherein agreement exists when one value within the first set is equivalent to a corresponding value within the second set.

4. The method of claim 2, wherein lack of agreement exists when one value within the first set is not equivalent to a corresponding value within the second set.

5. The method of claim 1, wherein said identifying an object and receiving the first set of parameters for the object are performed in a first single perspective model, and said receiving the second set of parameters are performed in a second single perspective model.

6. A method for collaborating on perspectives of an object, the method being executed on electronic computer hardware in combination with software, comprising:
- defining a first single perspective model, the first single perspective model including an object and a value associated with the object;
- defining a second single perspective model, the second single perspective model including the object and a value associated with the object;
- associating the first and second value to form a multi-perspective model, the associating comprising:
- comparing the first and second value for points of agreement and points of disagreement;
  - merging the first and second values into a common value if they are in agreement;
  - preserving the first and second values within the multi-perspective model if they are not in agreement;
- visually presenting the multi-perspective model, including visually presenting together the common values that represent agreement as merged during the merging step and the first and second values that represents a lack of agreement from the comparing step and the preserving step, for further consideration of the object.

7. The method of claim 6, wherein agreement exists when the first value is equivalent to the second value.

8. The method of claim 6, wherein lack of agreement exists when one value within the first set is not equivalent to a corresponding value within the second set.

9. The method of claim 6, wherein said identifying an object and receiving the first set of parameters for the object are performed in a first single perspective model, and said receiving the second set of parameters are performed in a second single perspective model.

10. A method for collaborating on perspectives of an object, the method being executed on electronic computer hardware in combination with software, comprising:
- identifying an object;
- receiving a first set of parameters for the object, said first set of parameters representing a perspective of a first participant;
- defining, in single perspective model syntax, a first single perspective model based on the first set of parameters;
- receiving a second set of parameters for the object, said second set of parameters representing a perspective of a second participant;
- defining, in single perspective model syntax, a second single perspective model based on the first set of parameters;
- organizing the first and second single model perspectives into a multi-perspective model having multi-perspective syntax, comprising:
  - comparing the first set and second sets of parameters for points of agreement and points of disagreement;
  - merging points of agreement within the multi-perspective model between said first and second set of parameters from the comparing step; and
  - preserving points of lack of agreement within the multi-perspective model between said first and second set of parameters from the comparing step; and
- visually presenting the multi-perspective model, including visually presenting together the points of agreement as merged from the merging step and the points of lack of agreement from the comparing step and the preserving step, for further consideration of the object.

11. The method of claim 10, wherein said first and set of parameters provide values associated with the perspectives.

12. The method of claim 11, wherein agreement exists when one value within the first set is equivalent to a corresponding value within the second set.

13. The method of claim 11, wherein lack of agreement exists when one value within the first set is not equivalent to a corresponding value within the second set.

* * * * *